US011497084B2

(12) United States Patent
Seki et al.

(10) Patent No.: US 11,497,084 B2
(45) Date of Patent: Nov. 8, 2022

(54) HEATER DEVICE

(71) Applicant: DENSO CORPORATION, Kariya (JP)

(72) Inventors: Hideki Seki, Kariya (JP); Kimitake Ishikawa, Kariya (JP); Hirokazu Yamadaki, Kariya (JP); Yusuke Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 449 days.

(21) Appl. No.: 16/802,125

(22) Filed: Feb. 26, 2020

(65) Prior Publication Data
US 2020/0196392 A1 Jun. 18, 2020

Related U.S. Application Data

(63) Continuation-in-part of application No. PCT/JP2018/032641, filed on Sep. 3, 2018.

(30) Foreign Application Priority Data

Sep. 4, 2017 (JP) .............................. JP2017-169654
May 30, 2018 (JP) .............................. JP2018-104023

(51) Int. Cl.
*H05B 3/03* (2006.01)
*H05B 1/02* (2006.01)
*B60H 1/22* (2006.01)
*H05B 3/28* (2006.01)

(52) U.S. Cl.
CPC ................ *H05B 3/03* (2013.01); *B60H 1/22* (2013.01); *H05B 1/0236* (2013.01); *H05B 3/28* (2013.01)

(58) Field of Classification Search
CPC .......... H05B 3/03; H05B 1/0236; H05B 3/28; H05B 2203/032; B60H 1/22; B60H 1/2227
USPC ........................................................ 219/542
See application file for complete search history.

(56) References Cited

U.S. PATENT DOCUMENTS

| 2008/0017625 | A1  | 1/2008 | Ito et al. |
| 2008/0208440 | A1* | 8/2008 | Hiramatsu ............ F02D 41/008 123/90.15 |
| 2009/0225055 | A1  | 9/2009 | Oki |
| 2010/0219173 | A1* | 9/2010 | Gruber .................. B60S 1/0848 219/203 |
| 2012/0032007 | A1* | 2/2012 | Mulder .................... C12C 7/14 241/8 |

(Continued)

FOREIGN PATENT DOCUMENTS

| JP | H05-290697 A | 11/1993 |
| JP | 2007114122 A | 5/2007 |

(Continued)

*Primary Examiner* — Tom P Duong
(74) *Attorney, Agent, or Firm* — Harness, Dickey & Pierce, P.L.C.

(57) ABSTRACT

A heater device includes a heat generation layer that has a heat generation portion configured to generate heat when energized, a pair of electrodes disposed on one side of the heat generation layer and being spaced from each other, a detection portion configured to generate an electric field between the pair of electrodes and detect an object around the pair of electrodes, and a controller configured to control the amount of electric power supplied to the heat generation portion based on a detection result by the detection portion.

14 Claims, 9 Drawing Sheets

(56) References Cited

U.S. PATENT DOCUMENTS

| | | | |
|---|---|---|---|
| 2012/0103960 A1* | 5/2012 | Bressand | H05B 3/84 |
| | | | 219/203 |
| 2013/0113239 A1* | 5/2013 | Akaike | B60N 2/5685 |
| | | | 297/180.1 |
| 2015/0212644 A1 | 7/2015 | Noto | |
| 2016/0039265 A1 | 2/2016 | Ota et al. | |
| 2017/0129310 A1* | 5/2017 | Sagou | B60H 1/2226 |
| 2017/0321902 A1* | 11/2017 | Ishikawa | H05B 3/20 |
| 2018/0297449 A1* | 10/2018 | Oide | B60H 1/2215 |
| 2019/0041630 A1* | 2/2019 | Park | G02B 7/028 |
| 2019/0248211 A1* | 8/2019 | Seki | H05B 3/342 |
| 2019/0278158 A1* | 9/2019 | Ishizuka | H04N 5/22521 |

FOREIGN PATENT DOCUMENTS

| | | |
|---|---|---|
| JP | 2008024087 A | 2/2008 |
| JP | 2014190674 A | 10/2014 |
| JP | 2015141555 A | 8/2015 |
| WO | WO-2008059795 A1 | 5/2008 |
| WO | WO-2016117376 A1 | 7/2016 |

* cited by examiner

HEATER DEVICE

CROSS REFERENCE TO RELATED APPLICATION

The present application is a continuation-in-part application of International Patent Application No. PCT/JP2018/032641 filed on Sep. 3, 2018, which designated the U.S. and claims the benefit of priority from Japanese Patent Application No. 2017-169654 filed on Sep. 4, 2017, and Japanese Patent Application No. 2018-104023 filed on May 30, 2018. The entire disclosures of all of the above applications are incorporated herein by reference.

TECHNICAL FIELD

The present disclosure relates to a heater device.

BACKGROUND

A kind of general heater device includes a plane-type capacitive sensor. The heater device includes a body portion having a heat generation portion that generates heat when energized, and conductive portions which function as electrodes for detecting a change in capacitance caused by an object entering a predetermined area around the body portion. In the heater device, the conductive portions have a predetermined capacitance, and a contiguity or a contact of an object is detected by detecting a change in the capacitance caused by an object approaching the conductive portions.

SUMMARY

According to an aspect of the present disclosure, a heater device includes: a heat generation layer that has a heat generation portion configured to generate heat when energized; a pair of electrodes disposed on one side of the heat generation layer, the pair of electrodes being spaced from each other; a detection portion configured to generate an electric field between the pair of electrodes and detect an object around the pair of electrodes; and a controller configured to control the amount of electric power supplied to the heat generation portions based on a detection result by the detection portion.

EMBODIMENTS

Figure 1:
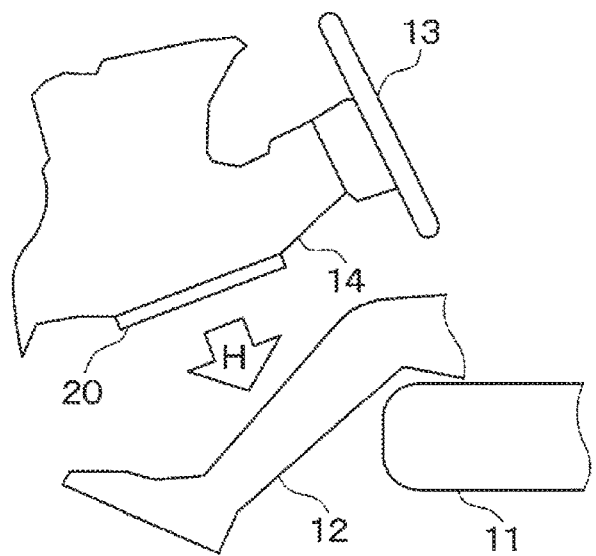
FIG. 1 is a diagram illustrating a heater device according to at least one embodiment of the present disclosure.

The inventors have found that, in a heater device that detects using a plane-type capacitive sensor, the detection accuracy of an object may decrease due to capacitance between the conductive portion and peripheral components when the capacitance between the conductive portion and the peripheral components is large. The heater device might be installed in a passenger compartment of a vehicle and used for heating feet of an occupant, for example. However, a vehicle has metal components such as a vehicle body, and large capacitance may occur between the heater device and the metal components such as a vehicle body. Further, various electric components are disposed inside an instrument panel of a vehicle. The electric components emit electromagnetic noise that may affect the capacitance in the heater device.

Accordingly, in configurations in which a contiguity or a contact of an object is detected by detecting capacitance newly generated when an object approaches the conductive portions, the detection accuracy of an object may be decreased due to the electromagnetic noise from the vehicle components such as the electric components and the large capacitance generated between the conductive portion and the vehicle body or the vehicle components such as the electric components, and accordingly the temperature of the heater device may increase even when an object is in contact.

Hereinafter, embodiments of the present disclosure will be described with reference to the drawings. In the following embodiments, the same reference numeral is given to the same or equivalent parts in the drawings.

First Embodiment

A heater device of a first embodiment will be described with reference to FIGS. 1 to 12. In FIG. 1, the heater device 20 according to the first embodiment is installed in an interior of a moving object such as a road traveling vehicle, a ship, or an aircraft. The heater device 20 is a part of a heating device for the interior. The heater device 20 is an electric heater that is supplied with a power from a power supply such as a battery and a generator mounted on the moving object to generate heat. The heater device 20 has a thin plate-shape. The heater device 20 generates heat when power is supplied. The heater device 20 radiates a radiant heat H primarily in a direction perpendicular to a surface of the heater device 20 to warm a target object positioned in the direction perpendicular to the surface.

A seat 11 for an occupant 12 is installed in the interior. The heater device 20 is installed in the interior to radiate the radiant heat H to feet of the occupant 12. The heater device 20 can be used for quickly providing warmth to the occupant 12 immediately after activating other heating devices, for example. The heater device 20 is installed on a wall surface of the interior. The heater device 20 is arranged to face the occupant 12 who is in an assumed normal posture. For example, a vehicle for traveling a road has a steering column 14 for supporting a steering wheel 13. The heater device 20 may be arranged under the steering column 14 to face the occupant 12.

Figure 2:
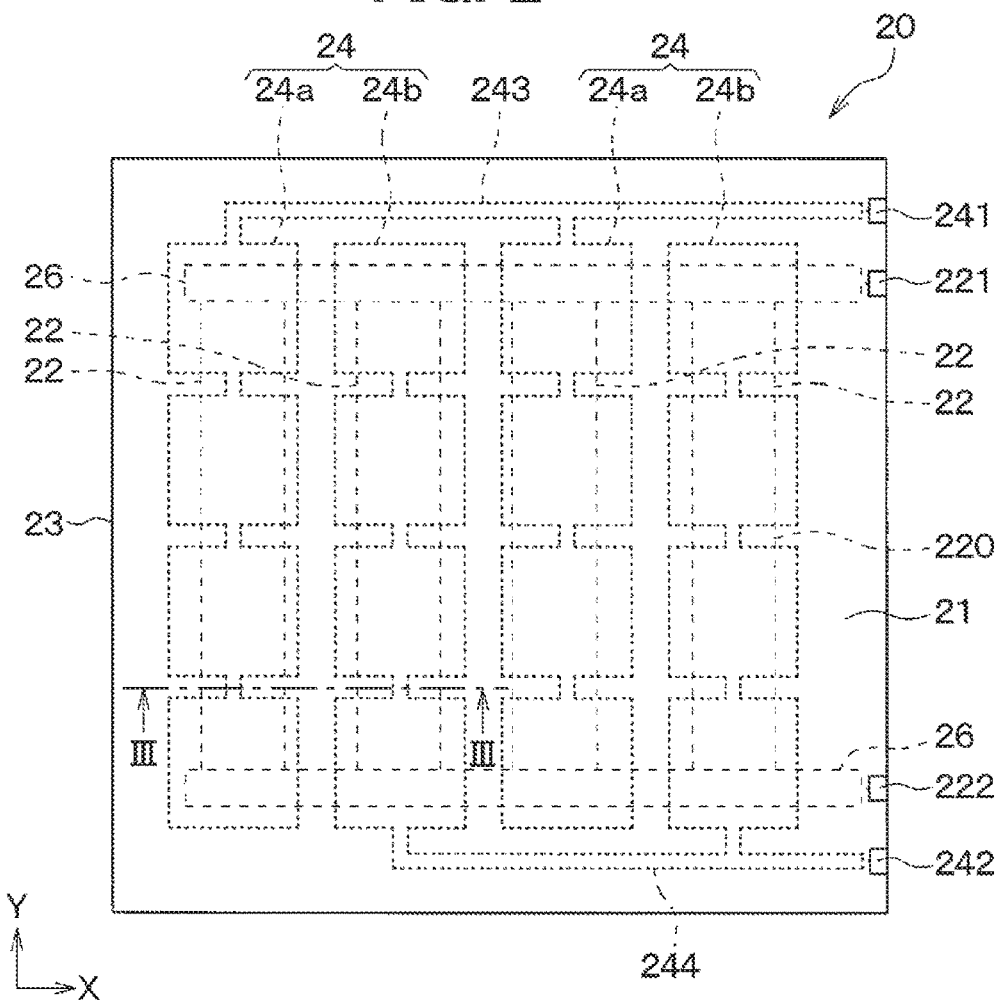
FIG. 2 is a schematic diagram illustrating the heater device.
Figure 3:
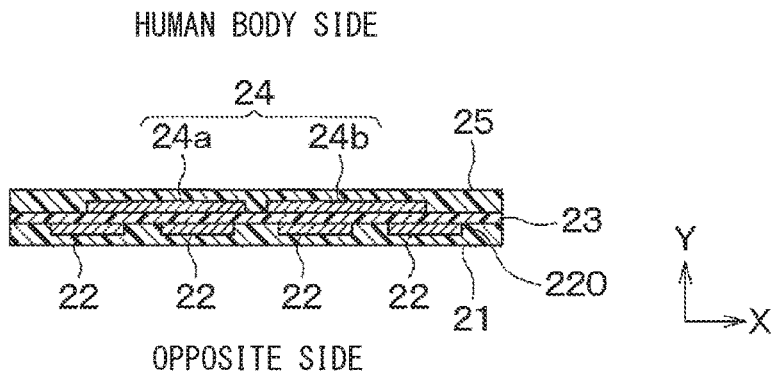
FIG. 3 is a cross-sectional view taken along a line III-III in FIG. 2.

The configurations of the heater device 20 will be described with reference to FIGS. 2 to 5. In FIGS. 2, 3, the heater device 20 extends along the X-Y plane defined by an X-axis and a Y-axis. The heater device 20 has a thickness in a direction along a Z-axis. The heater device 20 has a thin plate-shape having a substantially rectangular shape. The heater device 20 includes a heat generation portion side low thermal conductivity portion 21, a heat generation layer 220, an insulation board 23, electrodes 24, and an electrode side low thermal conductivity portion 25. The heat generation portion side low thermal conductivity portion 21, the heat generation layer 220, the insulation board 23, the electrode 24, and the electrode side low thermal conductivity portion 25 constitute a heater body portion. The heater device 20 may also be referred to as a planar heater, which radiates the radiant heat H primarily in a direction perpendicular to its surface. The heat generation portion side low thermal conductivity portion 21 may be a first low thermal conductivity portion. The electrode side low thermal conductivity portion 25 may be a second low thermal conductivity portion.

The heat generation layer 220 includes multiple heat generation portions 22 which generate heat when energized, and two energization portions 26. The heat generation layer 220 is located on one side (opposite side) of the insulation board 23. That is, the heat generation portions 22 and the energization portions 26 are located on the one side of the insulation board 23.

Each heat generation portion 22 has a rectangular shape extending in a direction along the Y-axis. The heat generation portions 22 are aligned in a direction along the X-axis and spaced from each other. The heat generation portions 22 are connected with each other through the energization portion 26. The heat generation portions 22 are arranged regularly and occupies a predetermined area on the X-Y plane in the drawing.

The heat generation portions 22 are made of a material having a low electrical resistance. The heat generation portions 22 may be made of a metal. The material of the heat generation portions 22 are selected from materials whose thermal conductivity is lower than copper. For example, the heat generation portions 22 may be made of copper, alloy of copper and tin (Cu—Sn), a metal such as silver, tin, stainless steel, nickel, and nichrome, or alloy including at least one of silver, tin, stainless steel, nickel or nichrome.

The heat generation portions 22 can radiate the radiant heat H that causes the occupant 12, i.e. a person, to feel warmth by being heated to a predetermined radiation temperature. The heat generation portions 22 are made of a material having a high thermal conductivity.

Each of the energization portions 26 has a rectangular shape extending in the direction along the X-axis. The energization portions 26 are located on both sides of the heat generation portions 22 in the direction along the Y-axis. The energization portions 26 are made of a material having a low electrical resistance. One of the energization portions 26 is located on one end side of the heat generation portions 22 in the direction along the Y-axis, and connected to the heat generation portions 22 and a power-supply terminal 221. The other one of the energization portions 26 is located on the other end side of the heat generation portions 22 in the direction along the Y-axis, and connected to the heat generation portions 22 and a ground terminal 222.

The heat generation portion side low thermal conductivity portion 21 whose thermal conductivity is lower than that of the heat generation portion 22 is provided on the one side (opposite side) of the insulation board 23 and around the heat generation portions 22. The heat generation portion side low thermal conductivity portion 21 covers the heat generation portions 22 from the one side of the insulation board 23. The heat generation portion side low thermal conductivity portion 21 has a high insulating property and is made of polyimide film, an insulation resin or the like.

Since the heat generation portion side low thermal conductivity portion 21 whose thermal conductivity is lower than that of the heat generation portion 22 is provided between the heat generation portions 22, the thermal resistance of the heat generation layer 220 in a plane direction is high. Each of the heat generation portions 22 has a thin film shape and arranged on the one side of the insulation board 23 to be spaced from each other. Accordingly, the heat capacity of the heat generation layer 220 of the present embodiment is smaller than that of a heat generation layer having a thick plate shape.

As described above, the heat generation layer 220 of the present embodiment has a small heat capacity and a high thermal resistance. Accordingly, since the heat transfer in the plane direction of the heat generation layer 220 is suppressed when an object contacts the heater device 20, the temperature at the contacted part can be rapidly reduced. A thickness of the heat generation portion 22 is preferably at or below 50 micron and is further preferably at or below 20 micron such that the heat transfer in the surface direction of the heat generation layer 220 is sufficiently small.

The volumes of the heat generation portions 22 are designed such that the heat capacity is small. The heat capacity of each of the heat generation portions 22 is set such that a surface temperature of an area of the radiating heater device to which an object contacts decreases quickly in response to the contact of an object to the surface of the heater device. For an example of a desirable aspect, the heat capacity of the heat generation portion 22 is set so that the surface temperature of the contacted part decreases to be lower than 60 degrees Celsius when a human finger comes into contact with the surface of the heater device.

The heat generation layer 220 blocks noise emitted toward the one side (opposite side) of the insulation board 23. The heat generation layer 220 of the present embodiment functions not only as a heat radiator radiating the radiant heat but also as a noise block layer that blocks noise toward a transmitter electrode 24a and a receiver electrode 24b from a side of the heat generation layer 220 opposite from another side on which the transmitter electrode 24a and the receiver electrode 24b are located.

The insulation board 23 is made of a resin material which has an excellent electrical insulation property and withstands a high temperature. Specifically, the insulation board 23 is formed of a resin film. Multiple pairs of electrodes 24 are disposed on one side of the insulation board 23. The thermal conductivity of the insulation board 23 is lower than that of the heat generation portion 22.

The electrode 24 includes the transmitter electrode 24a and the receiver electrode 24b spaced from each other. The transmitter electrode 24a and the receiver electrode 24b are located on the other side (human body side) of the insulation board 23 and adjacent to each other. That is, multiple transmitter electrodes 24a and multiple receiver electrodes 24b are located on the other side of the insulation board 23.

Each transmitter electrode 24a has a rectangular shape extending in the direction along the Y-axis, and each receiver electrode 24b has a rectangular shape extending in the direction along the Y-axis. The transmitter electrode 24a and the receiver electrode 24b of a pair of the electrodes 24 are aligned in the direction along the X-axis and adjacent to each other. The electrodes 24 are arranged at regular intervals in the direction along the Y-axis. The transmitter electrode 24a and the receiver electrode 24b are made of a conductive metal such as copper. The transmitter electrode 24a and the receiver electrode 24b are made of the same material.

The transmitter electrodes 24a and the receiver electrodes 24b are regularly arranged and occupy a predetermined area on the X-Y plane in the drawings. Each of the transmitter electrodes 24a and the receiver electrodes 24b has a predetermined area on the X-Y plane in the drawings to generate capacitance for capacitive sensing.

The transmitter electrodes 24a are connected with a positive terminal 241 through a conductive portion 243, and the receiver electrodes 24b are connected with a negative terminal 242 through a conductive portion.

Figure 4:
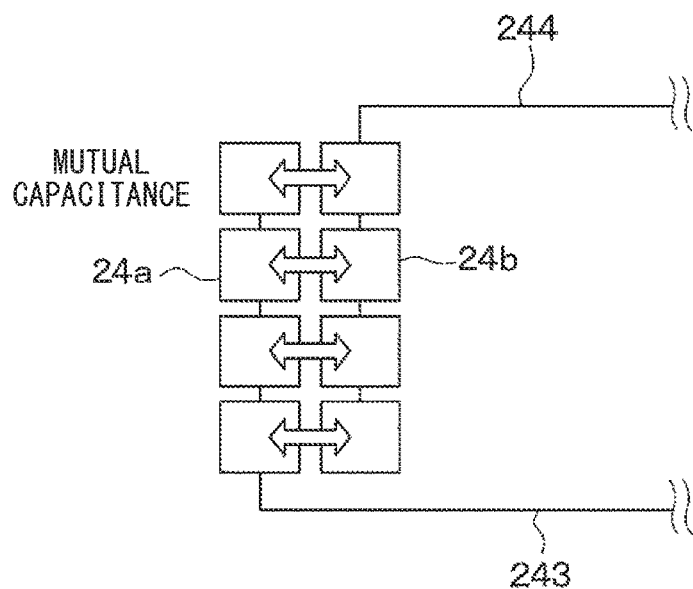
FIG. 4 is a schematic diagram illustrating electrodes of the heater device.

When predetermined voltage is applied between the positive terminal 241 and the negative terminal 242, an electric field is generated between the transmitter electrode 24a and the receiver electrode 24b. When an object such as a finger approaches the electric field, the capacitance between the transmitter electrode 24a and the receiver electrode 24b changes as shown in FIG. 4. That is, the change in the capacitance is caused by an object such as a finger entering the electric field generated between the transmitter electrode 24a and the receiver electrode 24b. A contiguity or a contact of an object such as a finger to the electrodes 24 is detected by detecting the change in the capacitance.

The transmitter electrodes 24a and the receiver electrodes 24b are located on the other side of the insulation board 23 and spaced from each other. The transmitter electrodes 24a and the receiver electrodes 24b are made of a material having a high thermal conductivity. The thermal conductivities of the transmitter electrodes 24a and the receiver electrodes 24b are higher than the thermal conductivity of the insulation board 23.

The electrode side low thermal conductivity portion 25 whose thermal conductivity is lower than that of the transmitter electrode 24a and the receiver electrode 24b is provided on the other side (human body side) of the insulation board 23 and around the transmitter electrode 24a and the receiver electrode 24b. The electrode side low thermal conductivity portion 25 covers the transmitter electrodes 24a and the receiver electrodes 24b from the other side (human body side) of the insulation board 23. The electrode side low thermal conductivity portion 25 has a high electrical insulation property and made of a polyimide film, an insulating resin, or the like.

In the heater device 20, the electrode side low thermal conductivity portion 25 whose thermal conductivity is lower than the transmitter electrode 24a and the receiver electrode 24b is provided between the transmitter electrode 24a and the receiver electrode 24b, and accordingly the thermal resistance of the heat generation layer 220 in the plane direction is high. Each of the transmitter electrode 24a and the receiver electrode 24b has a thin film shape, and the transmitter electrodes 24a and the receiver electrodes 24b are spaced from each other on the other side of the insulation board 23. Accordingly, the heat capacity of the transmitter electrode 24a and the receiver electrode 24b of the present embodiment is small.

Since the transmitter electrode 24a and the receiver electrode 24b of the present embodiment have a small heat capacity and a high thermal resistance, a heat transfer in the plane direction of the heat generation layer is limited when an object contacts, and the temperature of the area to which an object contacts decreases quickly.

The thickness of the transmitter electrode 24a and the receiver electrode 24b may be preferably at or below 50 microns. Further, the thickness of the transmitter electrode 24a and the receiver electrode 24b may be preferably at or below 20 microns such that the heat transfer in the transmitter electrode 24a and the receiver electrode 24b in the plane direction is sufficiently suppressed.

Figure 5:
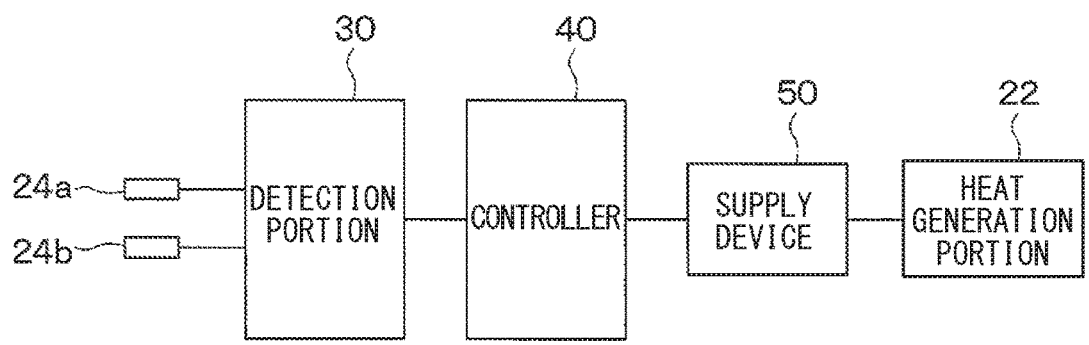
FIG. 5 is a block diagram illustrating the heater device.

Next, the heater device 20 of the present embodiment will be described with reference to the block diagram of FIG. 5. The heater device 20 includes a detection portion 30, a supply device 50, and a controller 40.

The detection portion 30 is configured to generate an electric field between the transmitter electrode 24a and the receiver electrode 24b and detect an object around the transmitter electrode 24a and the receiver electrode 24b. Specifically, the detection portion 30 is configured to: generate an electric field between the transmitter electrode 24a and the receiver electrode 24b by applying the predetermined voltage between the transmitter electrode 24a and the receiver electrode 24b; and detect a contiguity of an object around the transmitter electrode 24a and the receiver electrode 24b and a contact of an object to the transmitter electrode 24a and the receiver electrode 24b by detecting the change in the electric field between the transmitter electrode 24a and the receiver electrode 24b. The detection portion 30 is configured to output a signal indicative of the contiguity or the contact of an object to the controller 40 when detecting the contiguity or the contact of an object to the transmitter electrode 24a and the receiver electrode 24b. The detection portion 30 may be a capacitive touch sensor circuit configured to detect a value indicative of a change in electric field between the transmitter electrode 24a and the receiver electrode 24b. The detection portion 30 may detect a change in capacitance as the value indicative of a change in electric field. In this case, the detection portion 30 may be referred to as a capacitance detection circuit.

The supply device 50 is configured to supply electric power to the heat generation portions 22 in response to an instruction from the controller. The supply device 50 is configured to control the amount of electric power supplied to the heat generation portions 22. The energization to the heat generation portion 22 is performed through the supply device 50. The supply device may be a power source such as a battery, for example.

The controller 40 is a computer having a CPU, a memory etc., and the CPU performs various processing based on programs stored in the memory. The controller 40 is configured to instruct the supply device 50 to start and stop the energization to the heat generation portions 22. The memory is a non-transitory tangible storage medium.

Figure 6:
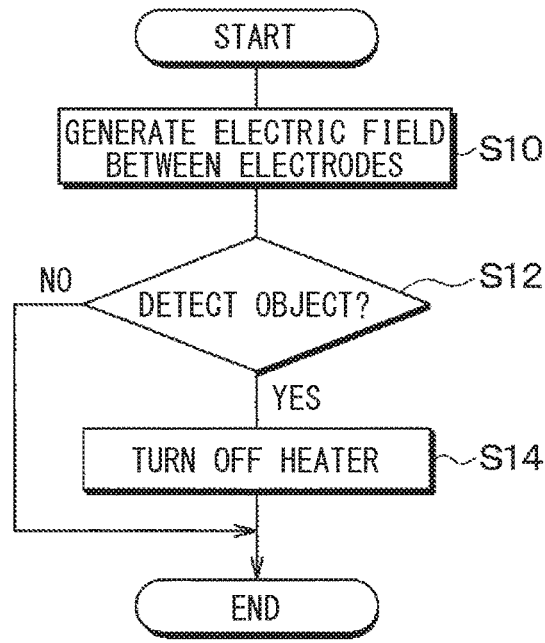
FIG. 6 is a flowchart of a controller of the heater device according to at least one embodiment of the present disclosure.
Figure 7:
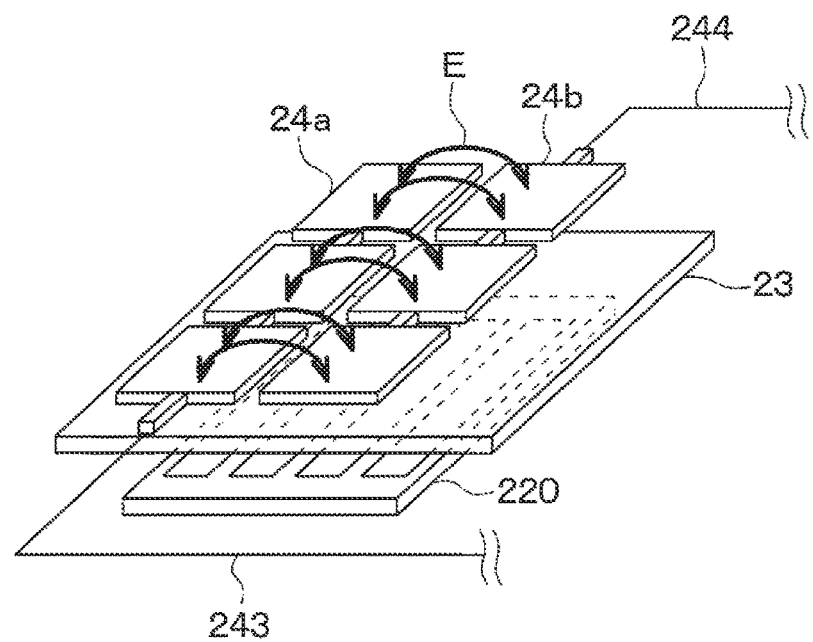
FIG. 7 is a schematic diagram illustrating the heater device according to at least one embodiment of the present disclosure.
Figure 8:
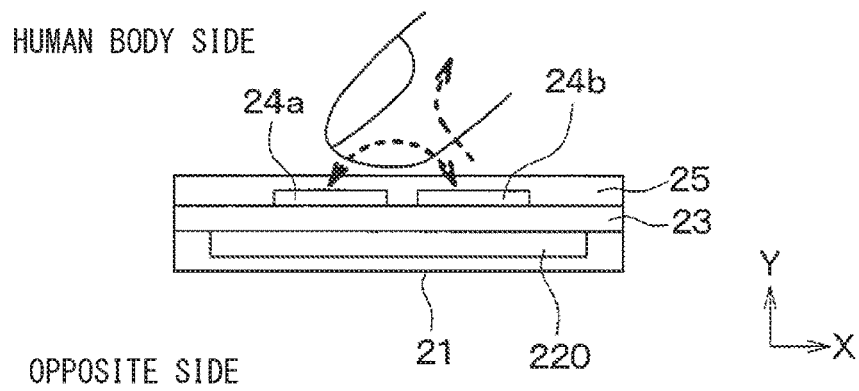
FIG. 8 is a diagram illustrating an electric field of the electrodes of the heater device.

Next, the processing by the controller 40 will be described with reference to FIGS. 6 to 8. The processing shown in FIG. 6 is performed repeatedly while the heater device 20 is turned on. Further, each control step in the flowcharts of the drawings includes various function implementation units which are included in the controller 40.

In step S10, the controller 40 outputs an energization instruction to the supply device to start energizing the heat generation portions 22, and applies pulsed voltage to the transmitter electrode 24a to generate an electric field between the transmitter electrode 24a and the receiver electrode 24b. As a result, an electric field is generated between the transmitter electrode 24a and the receiver electrode 24b as shown in FIG. 7.

The detection portion 30 is configured to determine whether an object approaches or contacts by determining whether the voltage between the transmitter electrode 24a and the receiver electrode 24b after a predetermined time elapsed from falling of the pulsed voltage of step S10 is at or above a predetermined threshold. The detection portion 30 is configured to output, to the controller 40, a signal indicative of the contiguity or the contact upon determining that an object approaches or contacts.

In next step S12, the controller 40 determines whether an object is detected based on the signal output from the detection portion 30. As shown in FIG. 8, when an object approaches or contacts at least one of the transmitter electrode 24a or the receiver electrode 24b, a part of the electric field generated between the transmitter electrode 24a and the receiver electrode 24b is absorbed by the finger. As a result, the electric field detected by the receiver electrode 24b decreases, and a signal indicative of a contiguity or a contact of an object is output from the detection portion 30 to the controller 40.

In this case, the controller 40 stops the heater in next step S14. Specifically, the controller 40 outputs an energization stop instruction to the supply device 50. The supply device 50 stops energization to the heat generation portions 22 in response to the energization stop instruction.

When the signal indicative of a contiguity or a contact of an object is not output from the detection portion 30 to the controller 40, the controller 40 ends this process without performing the process of S14.

The heater device of the present embodiment quickly decreases the temperature of the contacted part in response to a contact of an occupant to the surface of the heater even when the heater temperature was increased to a temperature (100 degrees Celsius, for example) at which the occupant feels warmth. Specifically, the temperature of the contacted part drops to 52 degrees Celsius or less such that a reflex action of the occupant due to the temperature would not occur. Therefore, a safe heater device can be provided.

Further, the heater device of the present embodiment stops energization to the heat generation portion 22 when a contiguity or a contact of an object is detected. Accordingly, the heater device would not cause discomfort feeling of the occupant even when the occupant keeps touching the surface of the heater device without noticing it for a relatively long time, for example.

General capacitive sensors include a plane-type capacitive sensor, and a self capacitive sensor that is one of projected capacitive type sensors that is currently the mainstream type. The inventors have studied and found that, in these sensors, large capacitance occurs between the electrode of the heater device and vehicle components such as a vehicle body and electric components when electromagnetic noise is emitted from vehicle components such as a vehicle body, electric components, and the like, and the capacitance causes a decrease of the detection accuracy of an object. In view of the above-described points, a mutual capacitive sensor that is one of projected capacitive type sensors is used as the capacitive sensor of the present embodiment.

Next, an operation principle of a mutual capacitive sensor will be described with reference to FIGS. 9, 10. A schematic diagram of a transmitter electrode 34a and a receiver electrode 34b is illustrated on the left side in FIG. 9, and an equivalent circuit of the transmitter electrode 34a and the receiver electrode 34b is illustrated on the right side in FIG. 9.

Figure 9:
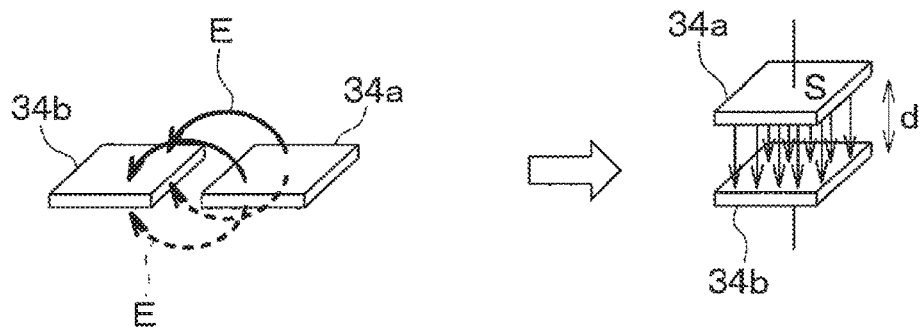
FIG. 9 is a diagram for explaining an operation principle of a mutual capacitive sensor.

As shown on the left side in FIG. 9, the transmitter electrode 34a and the receiver electrode 34b are adjacent to each other in the mutual capacitive sensor. An electric field is created between the transmitter electrode 34a and the receiver electrode 34b when voltage is applied between the transmitter electrode 34a and the receiver electrode 34b. Specifically, the electric field is created on both one side and the other side of the electrodes. Arrows E in FIG. 9 represent field lines.

The capacitance C between the transmitter electrode 34a and the receiver electrode 34b can be expressed as in Equation 1, where ε is a permittivity between the transmitter electrode 34a and the receiver electrode 34b, S is an area of one electrode, and d is a distance between the electrodes.

$$C = \frac{\varepsilon \cdot S}{d} \qquad \text{(Equation 1)}$$

Figure 10:
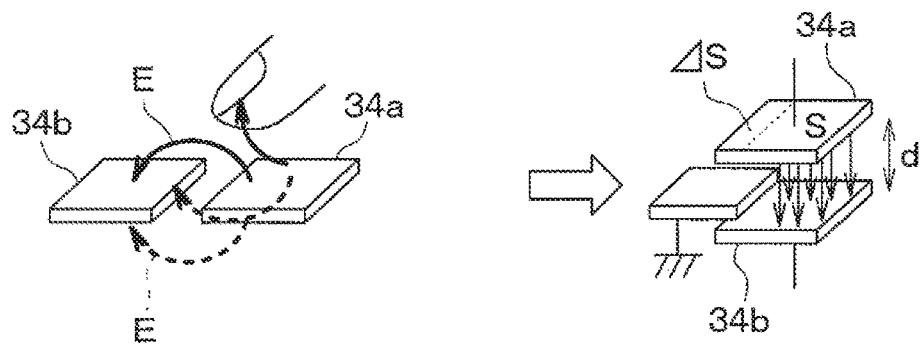
FIG. 10 is a diagram for explaining an operation principle of a mutual capacitive sensor.

When a finger that is a part of a human body approaches as an object around the electrode, a part of the field line is absorbed by the finger as shown on the left side in FIG. 10, and accordingly the electric field received by the receiver electrode 34b decreases. This situation can be regarded as equal to a situation where a grounded object is inserted between the transmitter electrode 34a and the receiver electrode 34b as shown on the right side in FIG. 10.

In this case, the capacitance C between the transmitter electrode 34a and the receiver electrode 34b can be expressed as in Equation 2, where ΔS is an area of the grounded object overlapping the electrodes.

$$C' = \frac{\varepsilon \cdot (S - \Delta S)}{d} \qquad \text{(Equation 2)}$$

That is, the contiguity of the finger can be detected by checking the difference between the capacitance C expressed in the equation 1 and the capacitance C' expressed in the equation 2.

Next, the electrodes of the heater device of the present embodiment will be described with reference to FIGS. 11, 12. A schematic diagram of the transmitter electrode 24a and the receiver electrode 24b of the heater device of the present embodiment is illustrated on the left side in FIG. 11, and an equivalent circuit of the transmitter electrode 24a and the receiver electrode 24b is illustrated on the right side in FIG. 11.

Figure 11:
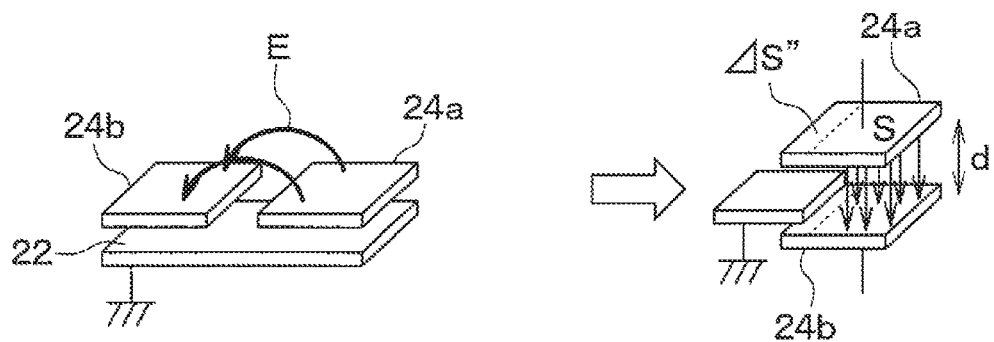
FIG. 11 is a diagram for explaining an operation of the heater device according to at least one embodiment of the present disclosure.

As shown on the left side in FIG. 11, the transmitter electrode 24a and the receiver electrode 24b are located on one side of the grounded heat generation portion 22 and adjacent to each other. An electric field is created between the transmitter electrode 24a and the receiver electrode 24b when voltage is applied between the transmitter electrode 24a and the receiver electrode 24b.

In the heater device of the present embodiment, since the transmitter electrode 24a and the receiver electrode 24b are located on the one side of the grounded heat generation portion 22 and adjacent to each other, an electric field is not created on a side of the transmitter electrode 24a and the receiver electrode 24b on which the heat generation portion 22 is located while an electric field is created on the other side of the transmitter electrode 24a and the receiver electrode 24b opposite from the side on which the heat generation portion 22 is located.

That is, since the grounded heat generation portion 22 is located on the side of the transmitter electrode 24a and the receiver electrode 24b opposite from the human body side, the field line on the heat generation portion 22 side of the transmitter electrode 24a and the receiver electrode 24b is absorbed by the heat generation portion 22, and the capacitance on the human body side of the transmitter electrode 24a and the receiver electrode 24b can be stabilized. Further, since the grounded heat generation portion 22 blocks electromagnetic noise from the side opposite from the human body side even when the electromagnetic noise emitted from the side opposite from the human body side, effects of the electromagnetic noise from the side opposite from the human body side on the transmitter electrode 24a and the receiver electrode 24b can be suppressed.

An equivalent circuit of the heater device of the present embodiment can be illustrated as shown on the right side in FIG. 9. The capacitance C" between the transmitter electrode 24a and the receiver electrode 24b can be expressed as in Equation 3, where ε is a permittivity between the transmitter electrode 24a and the receiver electrode 24b, S is an area of one electrode, ΔS" is an area covered with the heat generation portion 22 on the heat generation portion 22 side of the transmitter electrode 24a and the receiver electrode 24b.

$$C'' = \frac{\varepsilon \cdot (S - \Delta S'')}{d} \quad \text{(Equation 3)}$$

Figure 12:
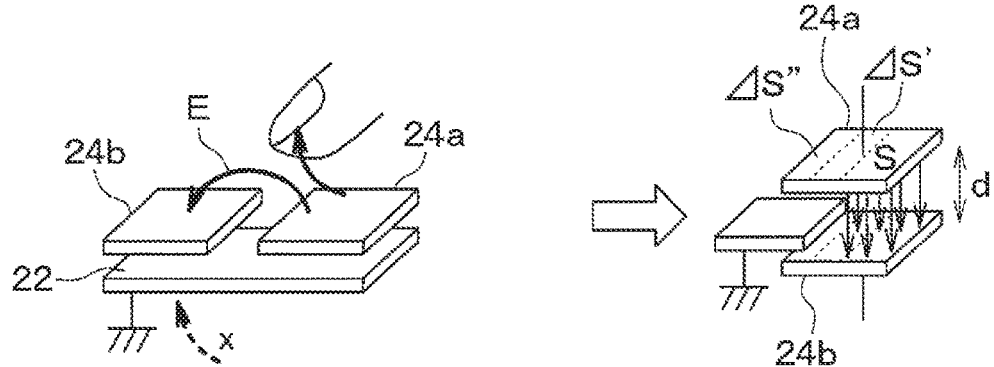
FIG. 12 is a diagram for explaining an operation of the heater device according to at least one embodiment of the present disclosure.

When a finger that is a part of a human body approaches as an object around the electrode, a part of the field line is absorbed by the finger as shown on the left side in FIG. 12, and accordingly the electric field received by the receiver electrode 24b decreases. This situation can be regarded as equal to a situation where a grounded object is inserted between the transmitter electrode 24a and the receiver electrode 24b as shown on the right side in FIG. 12.

In this case, the capacitance C' between the transmitter electrode 24a and the receiver electrode 24b can be expressed as in Equation 4, where ΔS' is an area of the grounded object overlapping the electrodes.

$$C' = \frac{\varepsilon \cdot (S - \Delta S'' - \Delta S')}{d} \quad \text{(Equation 4)}$$

That is, the contiguity of the finger can be detected by checking the difference between the capacitance C expressed in the equation 1 and the capacitance C' expressed in the equation 4.

As described above, the heater device includes: the heat generation layer 220 including the heat generation portions 22 that generate heat when energized; pairs of electrodes located on one side of the heat generation layer 220 and spaced from each other; the detection portion 30 configured to generate an electric field between a pair of electrodes and detect an object around the pair of electrodes; and controller 40 configured to control the amount of electric power supplied to the heat generation portions 22 based on the detection result by the detection portion 30.

According to such configurations, since the pair of electrodes 24a, 24b are located on the heat generation layer 220 and spaced from each other, the heat generation portion 22 blocks electromagnetic noise even when the electromagnetic noise is emitted from the side of the heat generation layer 220 opposite from the side on which the electrodes 24a, 24b are located, and the detection accuracy of an object can be improved. Further, since the detection portion 30 is configured to detect an object around a pair of electrodes by generating an electric field between the electrodes only on one side of the heat generation layer on which the occupant exists, the detection accuracy of an object can be further improved. Moreover, since the controller 40 is configured to control the amount of electric power supplied to the heat generation portion 22 based on the detection result by the detection portion 30, an increase of the temperature while an object is in contact can be suppressed.

Further, the heat generation layer 220 has a structure configured to limit the heat transfer in the plane direction of the heat generation layer 220. Accordingly, the temperature of the contacted area can be quickly decreased, and safety can be secured.

The heat generation layer 220 includes multiple heat generation portions 22, and the heat generation portion side low thermal conductivity portion 21 whose thermal conductivity is lower than the heat generation portions 22 is provided between the heat generation portions 22. Since the heat generation portion side low thermal conductivity portion 21 whose thermal conductivity is lower than the heat generation portions 22 is provided between the heat generation portions 22, the heat transfer in the plane direction of the heat generation layer 220 can be limited.

The pair of electrodes 24 can be provided as the transmitter electrode 24a and the receiver electrode 24b adjacent to each other.

Each of the transmitter electrode 24a and the receiver electrode 24b has a structure in which the heat transfer in the plane direction of the pair of the electrodes 24 is limited. Accordingly, the temperature of the contacted area can be quickly decreased in response to a contact of an object to the pair of electrodes, and safety can be secured.

The electrode side low thermal conductivity portion 25 that has a thermal conductivity lower than those of the transmitter electrode 24a and the receiver electrode 24b is provided between the transmitter electrode 24a and the receiver electrode 24b. Since the electrode side low thermal conductivity portion 25 whose thermal conductivity is lower than those of the transmitter electrode 24a and the receiver electrode 24b is provided between the transmitter electrode 24a and the receiver electrode 24b, the heat transfer in the plane direction of the pair of the electrodes 24 can be limited.

The detection portion 30 is configured to generate an electric field between the transmitter electrode 24a and the receiver electrode 24b, and detect an object around the transmitter electrode and the receiver electrode by mutual capacitive sensing that detects the capacitance between the transmitter electrode 24a and the receiver electrode 24b.

Accordingly, the detection of an object is less affected by emitted noise compared to another detection method such as a plane-type capacitive sensor and a self capacitive sensor that is one of projected capacitive type sensors.

The detection portion 30 is configured to generate an electric field between the transmitter electrode 24a and the receiver electrode 24b by applying pulsed voltage to the transmitter electrode 24a, and subsequently detect the capacitance between the transmitter electrode 24a and the receiver electrode 24b.

The heater device of the present embodiment includes the insulation board 23 between the heat generation portions 22, and the transmitter electrode 24a and the receiver electrode 24b. As described above, the insulation board 23 may be provided between the heat generation portions 22, and the transmitter electrode 24a and the receiver electrode 24b.

The transmitter electrode 24a and the receiver electrode 24b are made of the same material. Accordingly, the transmitter electrode 24a and the receiver electrode 24b can be manufactured at lower cost with a simpler manufacturing process compared to a situation where the transmitter electrode 24a and the receiver electrode 24b are made of different materials.

The heat generation layer 220 is arranged to radiate heat toward an object located on one side of the heat generation layer 220, and the pair of electrodes 24a, 24b are located on the one side of the heat generation layer 220. As described above, the heat generation layer 220 may be arranged to radiate heat toward an object located on one side of the heat generation layer 220, and the pair of electrodes 24a, 24b may be located on the one side of the heat generation layer 220.

Second Embodiment

Figure 13:
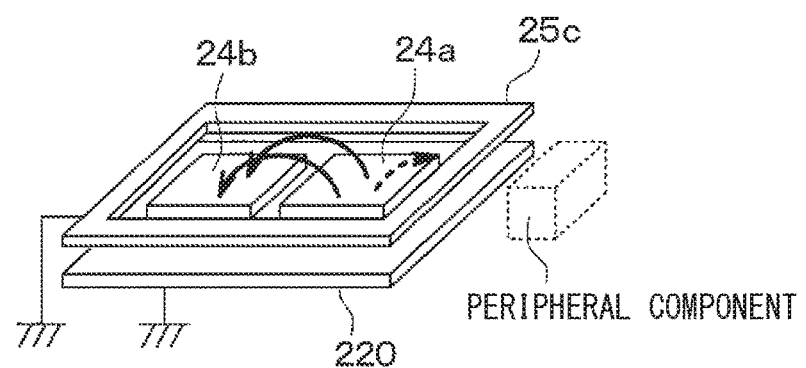
FIG. 13 is a schematic diagram illustrating a heater device according to at least one embodiment of the present disclosure.

A heater device of a second embodiment will be described with reference to FIGS. 13, 14. The heater device of the present embodiment includes a grounded electrode 25c surrounding the transmitter electrode 24a and the receiver electrode 24b on one side of the insulation board 23. Although the grounded electrode 25c surrounds the transmitter electrode 24a and the receiver electrode 24b in FIG. 13, actually, the grounded electrode 25c surrounds the transmitter electrode 24a and the receiver electrode 24b separately.

The heat generation portions 22 are connected with the power-supply terminal 221 through the energization portion 26 and connected with the ground terminal 222 through the energization portion 26.

The grounded electrode 25c and the heat generation portions 22 are grounded. Specifically, the grounded electrode 25c is connected with the ground terminal 222 through a connection line.

Figure 14:
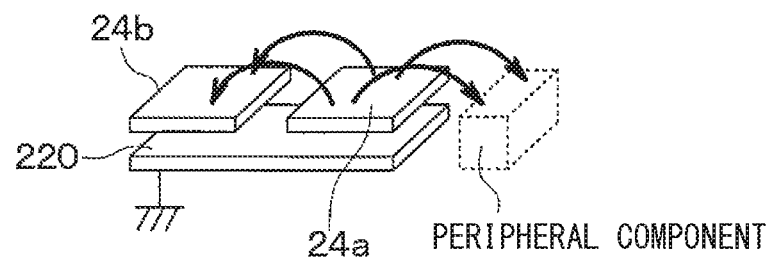
FIG. 14 is a diagram illustrating an electric field of electrodes of the heater device according to at least one embodiment of the present disclosure.

In cases where the grounded electrode 25c is not provided, capacitive coupling between conductive peripheral components and the electrode 24 occurs when the peripheral components exist around the heater device as shown in FIG. 14, and detection accuracy of an object may decrease.

In contrast, according to the heater device of the present embodiment, since the capacitive coupling between the electrode 24 and the conductive components around the heater device is suppressed by the grounded electrode 25c, the detection accuracy of an object can be improved.

As described above, the heater device of the present embodiment includes the grounded electrode 25c surrounding the transmitter electrode 24a and the receiver electrode 24b and connected with the ground terminal. Accordingly, the capacitive coupling between the electrode 24 and the conductive components around the heater device is suppressed by the grounded electrode 25c, and the detection accuracy of an object can be improved.

Third Embodiment

Figure 15:
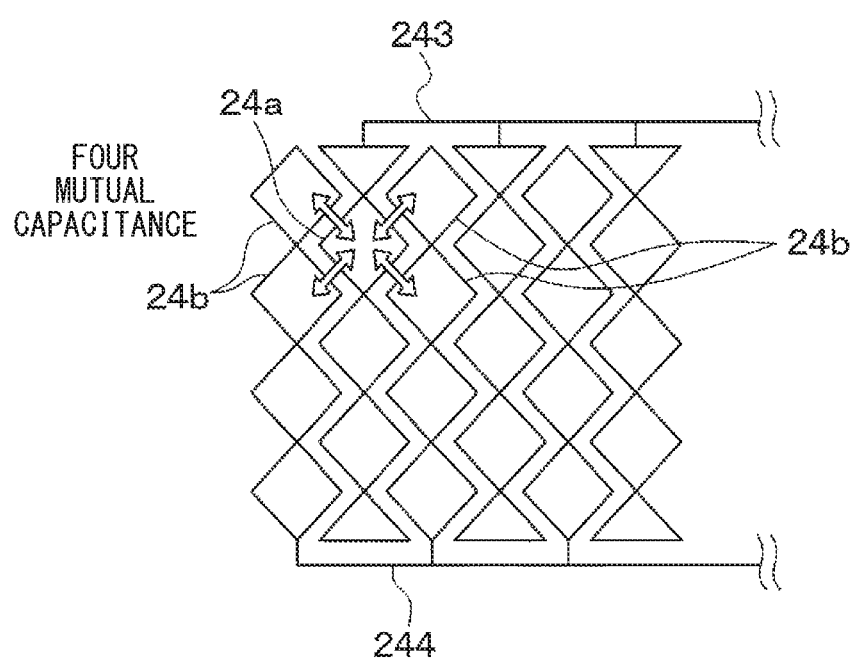
FIG. 15 is a diagram illustrating an electric field of electrodes of a heater device according to at least one embodiment of the present disclosure.

A heater device of a third embodiment will be described with reference to FIG. 15. In the heater device of the present embodiment, each of the transmitter electrodes 24a and the receiver electrodes 24b has a rectangular shape. Capacitive coupling occurs between one transmitter electrode 24a surrounded by four receiver electrodes 24b and the four receiver electrodes 24b each of which faces one of four sides of the one transmitter electrode 24a. That is, in at least one of the transmitter electrodes 24a, a first side faces one side of one receiver electrode 24b of the receiver electrodes 24b, and a second side adjacent to the first side faces one side of another receiver electrode 24b next to the one receiver electrode 24b facing the first side of the one transmitter electrode 24a.

The transmitter electrodes 24a are connected to each other, and pairs of opposite vertices of transmitter electrodes 24a are aligned on one line. Similarly, the receiver electrodes 24b are connected to each other, and pairs of opposite vertices of receiver electrodes 24b are aligned on one line.

According to the heater device of the present embodiment, in at least one of the transmitter electrodes 24a, a first side faces one side of one receiver electrode 24b of the receiver electrodes 24b, and a second side adjacent to the first side faces one side of another receiver electrode 24b next to the one receiver electrode 24b facing the first side of the one transmitter electrode 24a.

Accordingly, a contiguity and a contact of an object can be more accurately detected compared to a case where capacitive coupling occurs between one transmitter electrode 24a and one receiver electrode 24b as shown in FIG. 4.

In the heater device of the present embodiment, the transmitter electrodes 24a are connected to each other, and pairs of opposite vertices of transmitter electrodes 24a are aligned on one line. Similarly, the receiver electrodes 24b are connected to each other, and pairs of opposite vertices of receiver electrodes 24b are aligned on one line.

As described above, the transmitter electrodes 24a may be connected to each other, and pairs of opposite vertices of transmitter electrodes 24a may be aligned on one line. Similarly, the receiver electrodes 24b may be connected to each other, and pairs of opposite vertices of receiver electrodes 24b may be aligned on one line.

Fourth Embodiment

Figure 16:
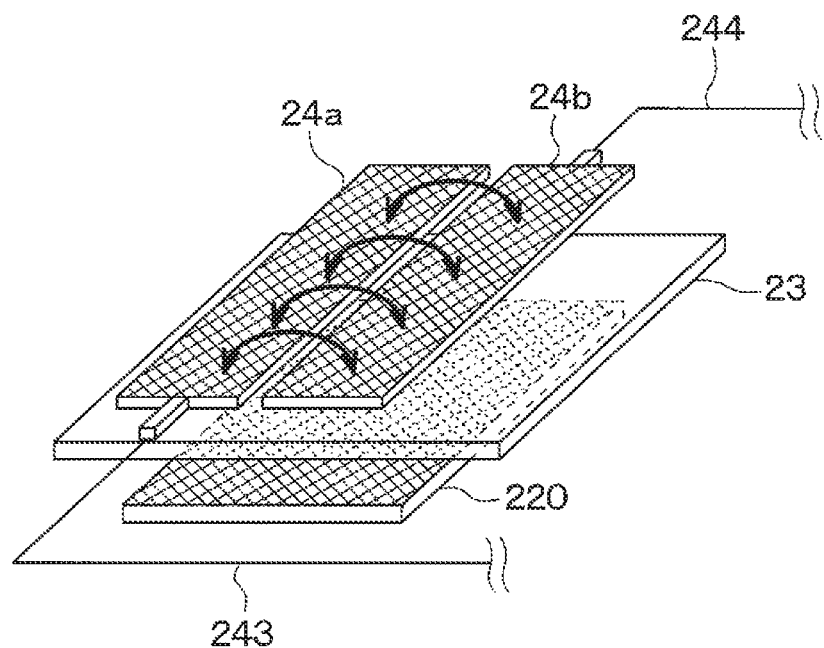
FIG. 16 is a schematic diagram illustrating a heater device according to at least one embodiment of the present disclosure.

A heater device of a fourth embodiment will be described with reference to FIG. 16. In the above-described embodiments, each of the transmitter electrodes 24a and the receiver electrodes 24b has a rectangular shape. In contrast, the transmitter electrode 24a and the receiver electrode 24b have a plate shape. Further, the transmitter electrode 24a and the receiver electrode 24b are formed of a thin metal film and have a mesh-like shape.

Since the transmitter electrode 24a and the receiver electrode 24b are formed of a thin metal film and have a mesh-like shape, the transmitter electrode 24a and the receiver electrode 24b have a smaller heat capacity and a higher thermal resistance compared to the above described embodiments. Accordingly, the heat transfer in the plane direction of the heat generation layer can be limited, and the temperature of a contacted area can quickly decrease in response to the contact of an object.

Fifth Embodiment

Figure 17:
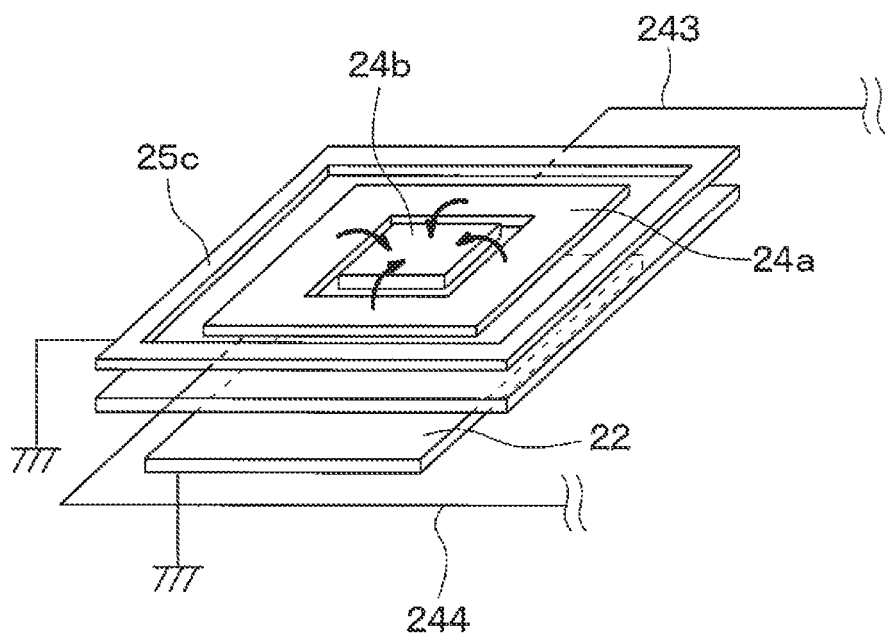
FIG. 17 is a schematic diagram illustrating a heater device according to at least one embodiment of the present disclosure.

A heater device of a fifth embodiment will be described with reference to FIG. 17. In the heater device of the present embodiment, one transmitter electrode 24a surrounds one receiver electrode 24b. Specifically, the transmitter electrode 24a has a platy shape and includes a hole portion 240 at its center, and the receiver electrode 24b is located inside the hole portion 240. A surface area of the transmitter electrode 24a is larger than a surface area of the receiver electrode 24b.

The heat generation portions 22 are connected with the ground terminal and thereby grounded. The heater device of the present embodiment includes the grounded electrode 25c surrounding the transmitter electrode 24a. The grounded electrode 25c is connected with the ground terminal and thereby grounded.

Since one transmitter electrode 24a surrounds one receiver electrode 24b and the surface area of the transmitter electrode 24a is larger than the surface area of the receiver electrode 24b, the capacitive coupling between the transmitter electrode 24a and the receiver electrode 24b can be stabilized.

Since the heat generation portion 22 is connected with the ground terminal and thereby grounded, the heat generation portions 22 block the emitted noise even when the noise is emitted from vehicle components located on a side of the heat generation portions 22 opposite from a side on which the transmitter electrode 24a and the receiver electrode 24b are located, and a generation of capacitance between the vehicle components, and the transmitter electrode 24a and the receiver electrode 24b. Accordingly, an object can be detected accurately.

Sixth Embodiment

Figure 18:
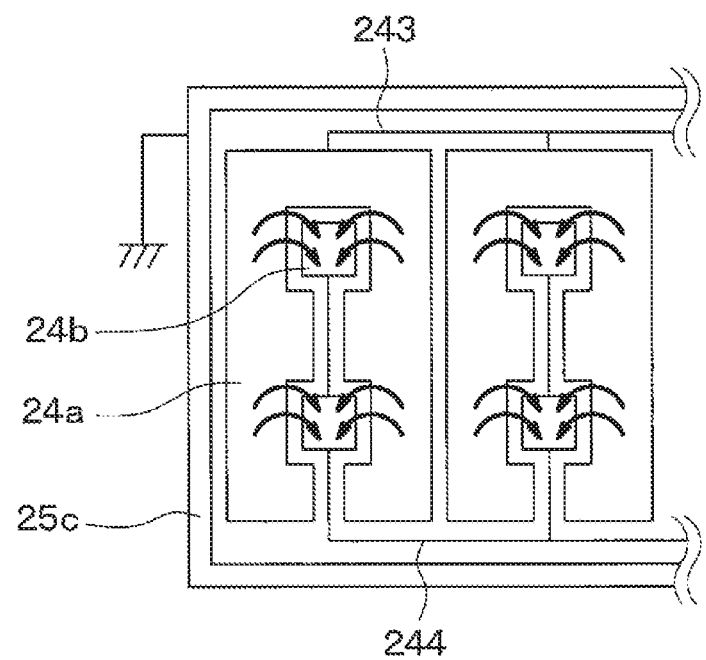
FIG. 18 is a schematic diagram illustrating a heater device according to at least one embodiment of the present disclosure.

A heater device of a sixth embodiment will be described with reference to FIG. 18. The heater device of the present embodiment includes the receiver electrodes 24b, and platy-shaped transmitter electrodes 24a each of which surrounds some of the receiver electrodes 24b. In the heater device of the present embodiment, the receiver electrodes 24b are connected in parallel with each other, and the transmitter electrodes 24a are connected in parallel with each other. A surface area of one transmitter electrode 24a is larger than a surface area of one receiver electrode 24b. The receiver electrode 24b and the transmitter electrode 24a are formed of metal mesh. The heater device of the present embodiment includes the grounded electrode 25c surrounding the transmitter electrodes 24a. The grounded electrode 25c is connected with the ground terminal and thereby grounded.

Since the transmitter electrode 24a is surrounded by the grounded electrode 25c, capacitive coupling between the transmitter electrode 24a and peripheral components can be suppressed.

The electrode side low thermal conductivity portion (not shown) whose thermal conductivity is lower than the electrodes 24 is provided between the receiver electrode 24b and the transmitter electrode 24a. Accordingly, the heat transfer in the plane direction of the electrodes 24 can be limited by the electrode side low thermal conductivity portion.

Seventh Embodiment

Figure 19:
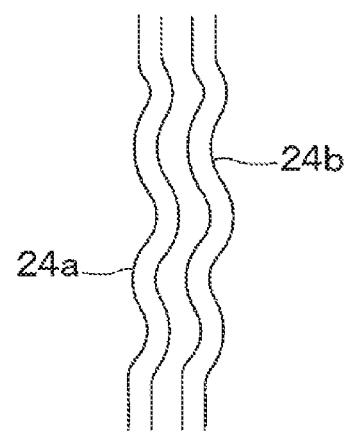
FIG. 19 is a schematic diagram illustrating electrodes of a heater device according to at least one embodiment of the present disclosure.

A heater device of a seventh embodiment will be described with reference to FIG. 19. The transmitter electrode 24a and the receiver electrode 24b of the heater device of the present embodiment have a meandering shape. As described above, the transmitter electrode 24a and the receiver electrode 24b may have a meandering shape.

Eighth Embodiment

Figure 20:
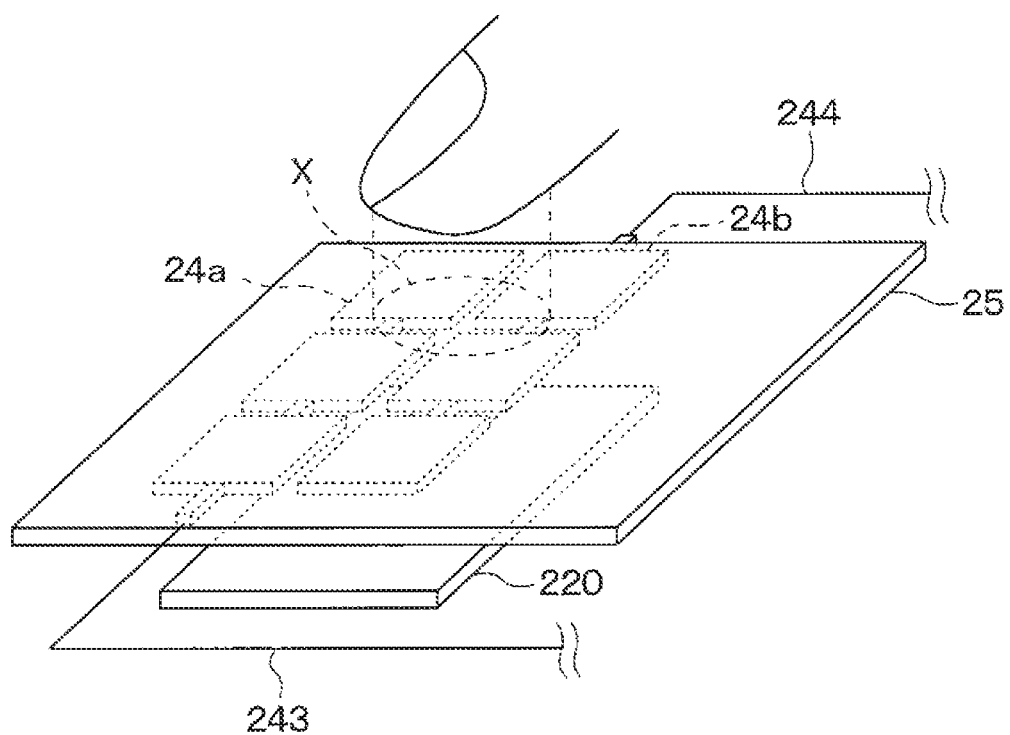
FIG. 20 is a schematic diagram illustrating a heater device according to at least one embodiment of the present disclosure.

A heater device of an eighth embodiment will be described with reference to FIG. 20. In the heater device of the present embodiment, the electrode side low thermal conductivity portion 25 covers the transmitter electrode 24a and the receiver electrode 24b. The electrode side low thermal conductivity portion 25 is formed of an insulation board whose thermal conductivity is lower than the electrodes 24a, 24b.

That is, in the heater device of the present embodiment, a clearance is formed between the transmitter electrode 24a and the receiver electrode 24b, and the electrode side low thermal conductivity portion 25 whose thermal conductivity is lower than the electrodes 24a, 24b is provided in the clearance. The heat transfer in the plane direction of the electrodes 24 can be limited by the electrode side low thermal conductivity portion 25. That is, in the heater device of the present embodiment, a proportion of an area occupied by the transmitter electrode 24a and the receiver electrode 24b in a predetermined unit area of a region where the transmitter electrode 24a and the receiver electrode 24b are disposed is smaller than 1.

The predetermined unit area is an area of a part to which a finger of a human could contact. In the present embodiment, the predetermined unit area is equal to or smaller than 1 square centimeter. A diameter of a finger of a child is about 5 millimeters, and a contact area of a finger of a child is about 0.2 square centimeters. A contact area of a finger of an adult is at or below 1 square centimeter.

As described above, the electrode side low thermal conductivity portion 25 whose thermal conductivity is lower than the transmitter electrode 24a and the receiver electrode 24b is provided between the transmitter electrode 24a and the receiver electrode 24b, and a proportion of an area occupied by the transmitter electrode 24a and the receiver electrode 24b in the predetermined unit area is smaller than 1. Accordingly, thermal resistance in the plane direction of the electrodes 24a, 24b can be high, and heat transfer in the plane direction of the electrodes 24a, 24b is limited. Therefore, the temperature can quickly decrease in response to a contact of a human body.

Since the predetermined unit area is equal to or smaller than 1 square centimeter, a contact of a finger can be accurately detected by the transmitter electrode 24a and the receiver electrode 24b in both cases where a finger of a child contacts and where a finger of an adult contacts.

Other Embodiments (1) In the above-described embodiments, the heater device is installed in a vehicle. However, the heater device may be used in another location other than a vehicle such as a building.

(2) In the above-described embodiments, a contacted object is detected using the same configurations of a mutual capacitive sensor that is one of projected capacitive type sensors. However, the configurations are not necessary exactly the same as the mutual capacitive sensor.

The present disclosure is not limited to the above-described embodiments, and can be appropriately modified. Individual elements or features of a particular embodiment are generally not limited to that particular embodiment, but, where applicable, are interchangeable and can be used in a selected embodiment, even if not specifically shown or described. Further, in each of the above-mentioned embodiments, it goes without saying that components of the embodiment are not necessarily essential except for a case in which the components are particularly clearly specified as essential components, a case in which the components are clearly considered in principle as essential components, and the like. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Further, in each of the embodiments described above, when materials, shapes, positional relationships, and the like, of the components and the like, are mentioned, they are not limited to these materials, shapes, positional relationships, and the like, unless otherwise specified and unless limited to specific materials, shapes, positional relationships, and the like.

CONCLUSION

According to a first aspect described in all or some of the above-described embodiments, the heater device includes: the heat generation layer that has the heat generation portion configured to generate heat when energized; a pair of electrodes disposed on one side of the heat generation layer; the detection portion configured to generate an electric field between the pair of electrodes, and detect an object around the pair of electrodes; and the controller configured to control the amount of electric power supplied to the heat generation portions based on a detection result by the detection portion.

According to a second aspect, the heat generation layer has a structure configured to limit heat transfer in the plane direction of the heat generation layer. Accordingly, the temperature of a contacted area can be quickly decreased in response to a contact of an object.

According to a third aspect, the heat generation layer includes multiple heat generation portions, and the heat generation portion side low thermal conductivity portion whose thermal conductivity is lower than thermal conductivity of the heat generation portions is provided between the heat generation portions.

As described above, since the heat generation portion side low thermal conductivity portion whose thermal conductivity is lower than that of the heat generation portion is provided between the heat generation portions, heat transfer between the heat generation portions is limited, and the temperature of a contacted area can be quickly decreased in response to a contact of an object to the heat generation portion.

According to a fourth aspect, the pair of electrodes is a pair of the transmitter electrode and the receiver electrode adjacent to each other.

The pair of electrodes can be provided as the transmitter electrode and the receiver electrode adjacent to each other.

According to a fifth aspect, the electrode side low thermal conductivity portion that has thermal conductivity lower than those of the transmitter electrode and the receiver electrode is provided between the transmitter electrode and the receiver electrode.

As described above, since the electrode side low thermal conductivity portion whose thermal conductivity is lower than those of the transmitter electrode and the receiver electrode is provided between the transmitter electrode and the receiver electrode, heat transfer between the transmitter electrode and the receiver electrode is limited, and the temperature of a contacted area can be quickly decreased in response to a contact of an object to the transmitter electrode and the receiver electrode.

According to a sixth aspect, a proportion of an area occupied by at least one of the transmitter electrode and the receiver electrode in a predetermined unit area in a region where the transmitter electrode and the receiver electrode are disposed is smaller than 1.

Accordingly, thermal resistance in the plane direction of the electrodes $24a$, $24b$ can be high, and heat transfer in the plane direction of the electrodes $24a$, $24b$ is limited. Therefore, the temperature can quickly decrease in response to a contact of a human body.

According to a seventh aspect, the predetermined unit area is equal to or smaller than 1 square centimeter. Since the predetermined unit area is equal to or smaller than 1 square centimeter, a contact of a finger can be accurately detected by the transmitter electrode and the receiver electrode in both cases where a finger of a child contacts and where a finger of an adult contacts.

According to an eighth aspect, the detection portion is configured to generate an electric field between the transmitter electrode and the receiver electrode, and detect an object around the transmitter electrode and the receiver electrode by mutual capacitive sensing that detects the capacitance between the transmitter electrode and the receiver electrode.

As described above, the detection portion is configured to generate an electric field between the transmitter electrode and the receiver electrode, and detect an object around the transmitter electrode and the receiver electrode by mutual capacitive sensing that detects the capacitance between the transmitter electrode and the receiver electrode.

According to a ninth aspect, the detection portion is configured to generate an electric field between the transmitter electrode and the receiver electrode by applying pulsed voltage to the transmitter electrode, and subsequently detect the capacitance between the transmitter electrode and the receiver electrode.

As described above, the detection portion is configured to generate an electric field between the transmitter electrode and the receiver electrode by applying pulsed voltage to the transmitter electrode, and subsequently detect the capacitance between the transmitter electrode and the receiver electrode.

According to a tenth aspect, the heater device includes the insulation board between the heat generation portions, and the transmitter electrode and the receiver electrode. As described above, the insulation board may be provided between the heat generation portions, and the transmitter electrode and the receiver electrode.

According to an eleventh aspect, the heater device includes the grounded electrode surrounding the transmitter electrode and the receiver electrode, and the grounded electrode is connected to the ground terminal.

Accordingly, effects of capacitance that may be caused by components around the transmitter electrode and the receiver electrode can be decreased.

According to a twelfth aspect, the heater device includes multiple transmitter electrodes and multiple receiver electrodes, and each of the transmitter electrodes and the receiver electrodes has a rectangular shape. In at least one of the transmitter electrodes, a first side faces one side of one receiver electrode of the receiver electrodes, and a second side adjacent to the first side faces one side of another receiver electrode next to the one receiver electrode facing the first side of the one transmitter electrode.

Accordingly, capacitance coupling between the transmitter electrodes and the receiver electrodes can be increased compared to a case where one rectangular transmitter electrode and one rectangular receiver electrode are adjacent to each other, for example, and an object can be more accurately detected.

According to a thirteenth aspect, the transmitter electrodes are connected to each other, and pairs of opposite vertices of transmitter electrodes are aligned on one line. Similarly, the receiver electrodes are connected to each other, and pairs of opposite vertices of receiver electrodes are aligned on one line.

As described above, the transmitter electrodes may be connected to each other, and pairs of opposite vertices of transmitter electrodes may be aligned on one line. Similarly, the receiver electrodes may be connected to each other, and pairs of opposite vertices of receiver electrodes may be aligned on one line.

According to a fourteenth aspect, the transmitter electrode surrounds the receiver electrode, and the surface area of the transmitter electrode is larger than the surface area of the receiver electrode.

Since the transmitter electrode surrounds the receiver electrode and the surface area of the transmitter electrode is larger than the surface area of the receiver electrode, effects of electromagnetic noise from surroundings can be suppressed.

According to a fifth aspect, the transmitter electrode and the receiver electrode are made of the same material. Since the transmitter electrode and the receiver electrode are made of the same material, the configurations of the heater device can be simplified.

According to a sixteenth aspect, the heat generation portion is grounded by connecting with the ground terminal. Accordingly, the heat generation portions block the emitted noise even when the noise is emitted from vehicle components located on a side of the heat generation portions opposite from a side on which the transmitter electrode and the receiver electrode are located, and a generation of capacitance between the vehicle components, and the transmitter electrode and the receiver electrode. Accordingly, an object can be detected accurately.

According to a seventeenth aspect, the heat generation layer is arranged to radiate heat toward an object located on one side of the heat generation layer, and the pair of electrodes are located on the one side of the heat generation layer. As described above, the heat generation layer may be arranged to radiate heat toward an object located on one side of the heat generation layer, and the pair of electrodes may be located on the one side of the heat generation layer.

What is claimed is:

1. A heater device comprising:
   a heat generation layer that has a plurality of heat generation portions configured to generate heat when energized;
   a pair of electrodes disposed on a first side of the heat generation layer, the pair of electrodes being spaced from each other;
   a detection portion configured to
     generate an electric field between the pair of electrodes and detect an object around the pair of electrodes;
   a controller configured to control an amount of electric power supplied to the plurality of heat generation portions based on a detection result by the detection portion;
   a heat generation portion side low thermal conductivity portion provided between the plurality of heat generation portions, thermal conductivity of the heat generation portion side low thermal conductivity portion being lower than thermal conductivity of the plurality of heat generation portions, thereby the heat generation layer having a structure configured to limit heat transfer in a plane direction of the heat generation layer;
   an electrode side low thermal conductivity portion provided between the pair of electrodes, thermal conductivity of the electrode side low thermal conductivity portion being lower than thermal conductivity of the pair of electrodes, thereby heat transfer in a plane direction of the pair of electrodes being limited; and
   an insulation board located between the plurality of heat generation portions and the pair of electrodes, wherein
   the plurality of heat generation portions are located on one side of the pair of electrodes, and the insulation board is located between the pair of electrodes and the plurality of heat generation portions, thereby an electric field on another side of the pair of electrodes opposite from the one side stabilize, and effects of electromagnetic noise from an area on a second side of the heat generation layer are limited, and
   the heat generation layer is arranged to radiate heat toward an object located in an area on the first side of the heat generation layer.

2. The heater device according to claim 1, wherein the pair of electrodes is a pair of a transmitter electrode and a receiver electrode adjacent to each other.

3. The heater device according to claim 2, wherein a proportion of an area occupied by at least one of the transmitter electrode or the receiver electrode in a predetermined unit area in a region in which the transmitter electrode and the receiver electrode are disposed is smaller than 1.

4. The heater device according to claim 3, wherein the predetermined unit area is equal to or smaller than 1 square centimeter.

5. The heater device according to claim 2, wherein the detection portion is configured to
   generate an electric field between the transmitter electrode and the receiver electrode and
   detect an object around the transmitter electrode and the receiver electrode using a mutual capacitance sensing by detecting capacitance between the transmitter electrode and the receiver electrode.

6. The heater device according to claim 5, wherein the detection portion is configured to
   apply pulsed voltage to the transmitter electrode to generate an electric field between the transmitter electrode and the receiver electrode and subsequently detect capacitance between the transmitter electrode and the receiver electrode.

7. The heater device according to claim 2, further comprising:
a grounded electrode surrounding the transmitter electrode and the receiver electrode, the grounded electrode being connected with a ground terminal.

8. The heater device according to claim 2, further comprising:
a plurality of the transmitter electrodes and a plurality of the receiver electrodes, wherein
each of the plurality of transmitter electrodes and the plurality of receiver electrodes has a rectangular shape,
a first side of at least one transmitter electrode of the plurality of transmitter electrodes faces one side of one receiver electrode of the plurality of receiver electrodes, and
a second side of the at least one transmitter electrode adjacent to the first side faces one side of another one receiver electrode of the plurality of receiver electrodes next to the one receiver electrode facing the first side of the at least one transmitter electrode.

9. The heater device according to claim 8, wherein
the plurality of transmitter electrodes are connected with each other and arranged such that opposite vertices of the plurality of transmitter electrodes are aligned on one line, and
the plurality of receiver electrodes are connected with each other and arranged such that opposite vertices of the plurality of receiver electrodes are aligned on another line.

10. The heater device according to claim 2, wherein
the transmitter electrode surrounds the receiver electrode, and
a surface area of the transmitter electrode is larger than a surface area of the receiver electrode.

11. The heater device according to claim 2, wherein
the transmitter electrode and the receiver electrode are made of a same material.

12. The heater device according to claim 1, wherein
the plurality of heat generation portions are connected with a ground terminal.

13. A heater device comprising:
a heat generation layer that has
a plurality of heat generation portions configured to generate heat when energized, and
a first low thermal conductivity portion provided between the plurality of heat generation portions, thermal conductivity of the first low thermal conductivity portion being lower than thermal conductivity of the plurality of heat generation portions;
an insulation board disposed on one side of the heat generation layer;
a pair of electrodes disposed on the insulation board and spaced from each other, thereby the insulation board being located between the heat generation layer and the pair of electrodes;
a second low thermal conductivity portion provided between the pair of electrodes, thermal conductivity of the second low thermal conductivity portion being lower than thermal conductivity of the pair of electrodes,
a detection circuit configured to
apply voltage between the pair of electrodes to generate an electric field between the pair of electrodes and
detect a value indicative of a change in the electric field caused by an object entering the electric field; and
a controller coupled with at least the detection circuit, wherein
the controller is configured to control an amount of electric power supplied to the plurality of heat generation portions based on the value detected by the detection circuit, and
the heat generation layer is arranged to radiate heat toward an object located in an area to which the one side of the heat generation layer faces.

14. The heater device according to claim 13, wherein
the detection circuit is a capacitance detection circuit configured to detect a change in capacitance between the pair of electrodes.

* * * * *